United States Patent [19]

Baumeister

[11] 4,290,677

[45] Sep. 22, 1981

[54] APPARATUS FOR CHECKING THE OPERATIONAL STATUS OF AN ELECTRONIC STROBE UNIT'S BATTERY UNDER LOAD CONDITIONS

[75] Inventor: Hans-Peter Baumeister, Churchville, N.Y.

[73] Assignee: Eastman Kodak Company, Rochester, N.Y.

[21] Appl. No.: 184,725

[22] Filed: Sep. 8, 1980

[51] Int. Cl.³ .......................................... G03B 15/02
[52] U.S. Cl. .................................. 354/127; 354/289
[58] Field of Search .................. 354/127, 60 R, 60 E, 354/60 L, 60 F, 128, 289

[56] References Cited

U.S. PATENT DOCUMENTS

| | | | |
|---|---|---|---|
| 3,743,931 | 7/1973 | Brodhacker | 324/29.5 |
| 3,810,212 | 5/1974 | Biber | 354/128 |
| 3,979,657 | 9/1976 | Yorksie | 320/13 |
| 4,001,639 | 1/1977 | Biber | 315/241 |
| 4,259,615 | 3/1981 | Kashihara et al. | 354/127 |

FOREIGN PATENT DOCUMENTS 2013432 4/1972 Fed. Rep. of Germany.
1497971 12/1973 Fed. Rep. of Germany.

Primary Examiner—Russell E. Adams
Attorney, Agent, or Firm—Douglas I. Hague

[57] ABSTRACT

A battery check apparatus for an electronic strobe flash unit automatically indicates the charge condition of a battery under load. The electronic strobe flash unit includes means for charging a storage capacitor. During the charging process, the time needed to charge the capacitor to a relatively small predetermined fraction of its maximum voltage is compared with a predetermined reference time, which is short in comparison with the usual total charging time of the capacitor. An electronic indicator is then controlled in response to the result of this comparison to provide a visual indication of the charge condition of the battery, well in advance of the time required to charge the capacitor fully.

6 Claims, 3 Drawing Figures

APPARATUS FOR CHECKING THE OPERATIONAL STATUS OF AN ELECTRONIC STROBE UNIT'S BATTERY UNDER LOAD CONDITIONS

BACKGROUND OF THE INVENTION

1. Field of the Invention

This invention relates to apparatus for testing storage batteries under load conditions. In particular, the invention relates to apparatus for automatically determining and indicating the voltage condition of the storage battery powering an electronic strobe flash unit well in advance of the time the battery normally requires to fully charge the flash unit.

2. Description Relative to the Prior Art

When a flash exposure is to be made with a camera using an electronic strobe flash unit, it is desirable to be able to determine before the exposure is made whether or not the battery is in operable condition. With cameras of the type wherein a single battery source supplies power for a built-in electronic flash unit as well as for other camera apparatus such as exposure control, film advance or shutter cocking, knowledge of the battery condition is particularly important because proper functioning of the camera cannot be assured with insufficient battery charge.

U.S. Pat. No. 4,001,639 discloses a battery condition-responsive control circuit for a camera of the type in which a single battery provides power for both a built-in electronic strobe flash unit and a film transport motor. The control circuit prevents recharging of the flash unit whenever the battery voltage falls below a predetermined value. During the interval in which the flash unit is not recharged, the failure of the flash ready light to be illuminated indicates to the photographer that the battery voltage is low and serves as a signal that the battery should be recharged or replaced. The disadvantage of this system is that the flash-ready lamp turns on only when the storage capacitor of the flash unit has been completely charged, an operation which can take more than one minute if the battery charge is low, and thus information on the battery condition cannot be obtained quickly.

Battery-check devices for cameras are disclosed in West German Patent Nos. 1,497,971 and 2,013,432 wherein the dropping of the battery voltage below a predetermined minimum value is indicated in the no-load or low-load condition of the battery. Such an indication, however, is useful only if the load on the battery is also low during operation. However, in an electronic flash unit a high load is applied to the battery during the initial charging of the storage capacitor and thus a battery-check device of this type is not suitable for rapidly indicating the condition of the battery during the capacitor charging operation.

SUMMARY OF THE INVENTION

An improved battery-check apparatus for a battery adapted to power an electronic flash unit is constructed so that shortly after the flash unit is switched on, it automatically indicates the charge condition of the battery. This is accomplished in accordance with the present invention by comparing (1) the time needed for charging the flash unit's storage capacitor to a predetermined voltage level, which is a small fraction of its final charging voltage, to (2) a reference time which is short in comparison to the total charging time of the capacitor. An electronic indicator is controlled in response to the result of this comparison to provide a visual indication of the charge condition of the battery, well in advance of the time normally required to fully charge the flash unit.

The invention and its objects and advantages will become more apparent by referring to the accompanying drawing and to the ensuing detailed description of the preferred embodiment.

DETAILED DESCRIPTION OF THE PREFERRED EMBODIMENT

Figure 1:
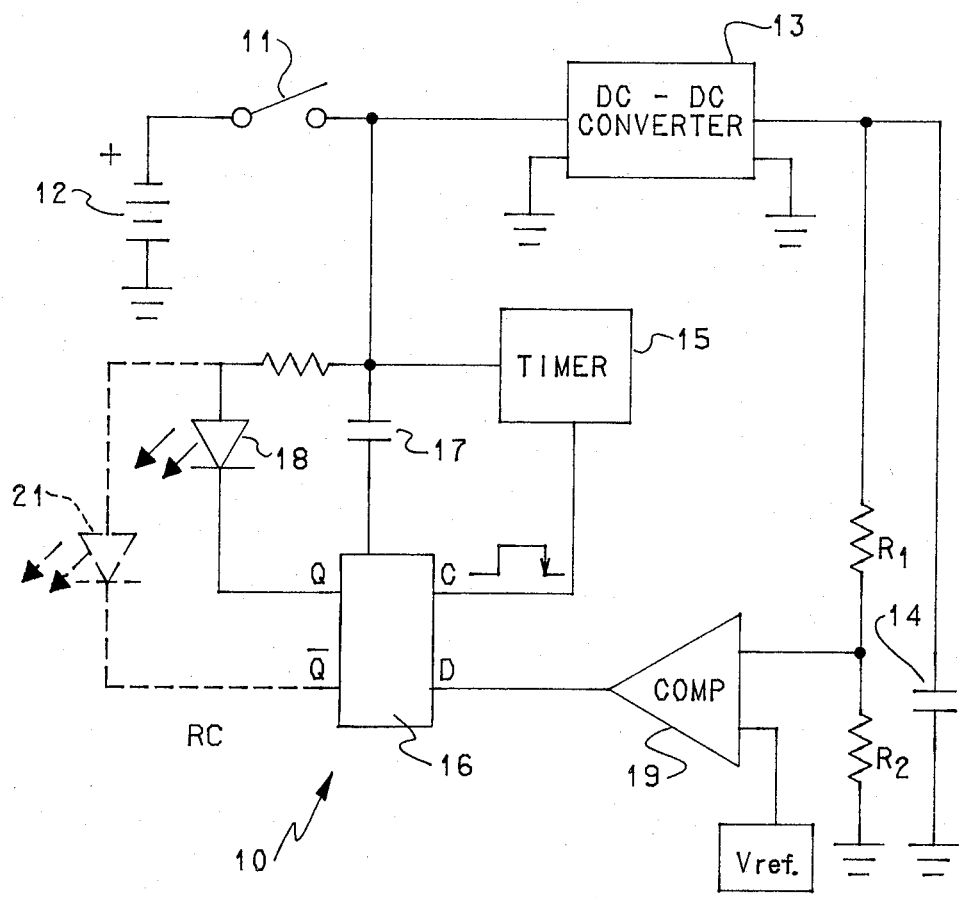
FIG. 1 illustrates the invention in partially schematic and partially block diagram form.

Because electronic strobe flash units are well known, the present description will be directed in particular to elements forming part of, or cooperating more directly with, apparatus in accordance with the present invention. It is to be understood that electronic flash elements not specifically shown or described may take various forms well known to persons having skill in the art.

With reference now to the drawing, when a main switch 11 of an electronic strobe flash unit, denoted generally 10, is closed, a storage battery 12 is connected to a DC-DC converter 13 which starts the charging of a storage capacitor 14. Closing of the switch 11 also activates a timer 15 which can, for example, be a monostable multivibrator. As shown in FIG. 2A, the output signal of the timer 15 is initially "high" but switches to "low" after a predetermined time interval $T_1$. A bistable switch 16 which can, for example, by a D-type, edge-triggered flip-flop, is initially set, via a capacitor 17, to a predetermined switch condition so that a battery condition indicator 18 connected to the Q output of the flip-flop 16 is switched ON. The charging voltage, $V_c$, of the capacitor 14 is fed via a voltage divider comprising series resistors $R_1$ and $R_2$ to one input of a comparator 19. A reference potential $V_{ref}$ is connected to the second input of the comparator 19 and the output of the comparator is connected to the D input of the flip-flop 16. The output of the timer 15 is connected to the C input of the flip-flop 16.

Figure 2B:
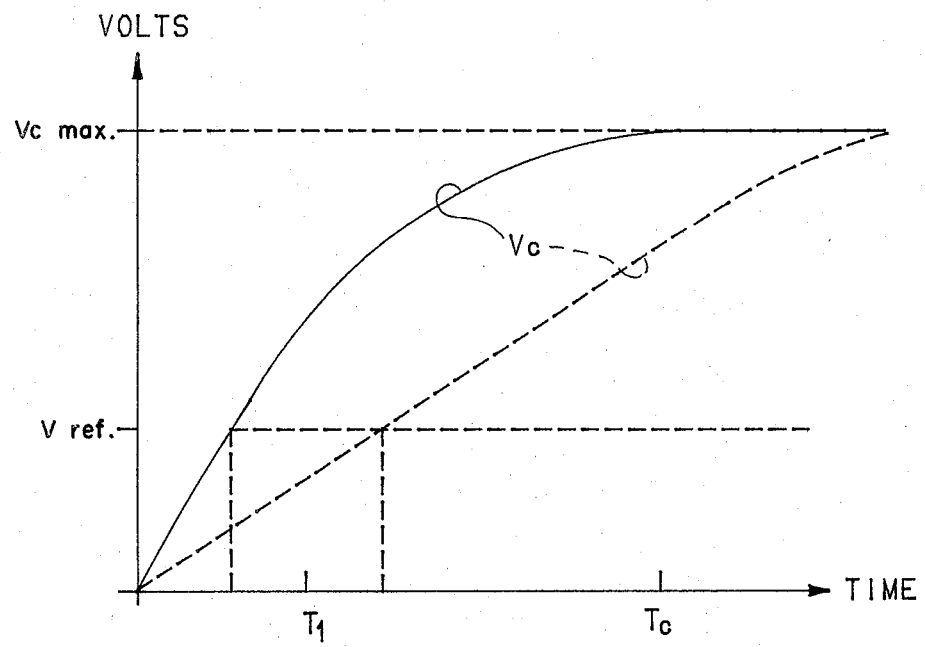
FIGS. 2A and 2B are graphs showing the timing sequence of the functions performed by the apparatus illustrated in FIG. 1.
Figure 2A:
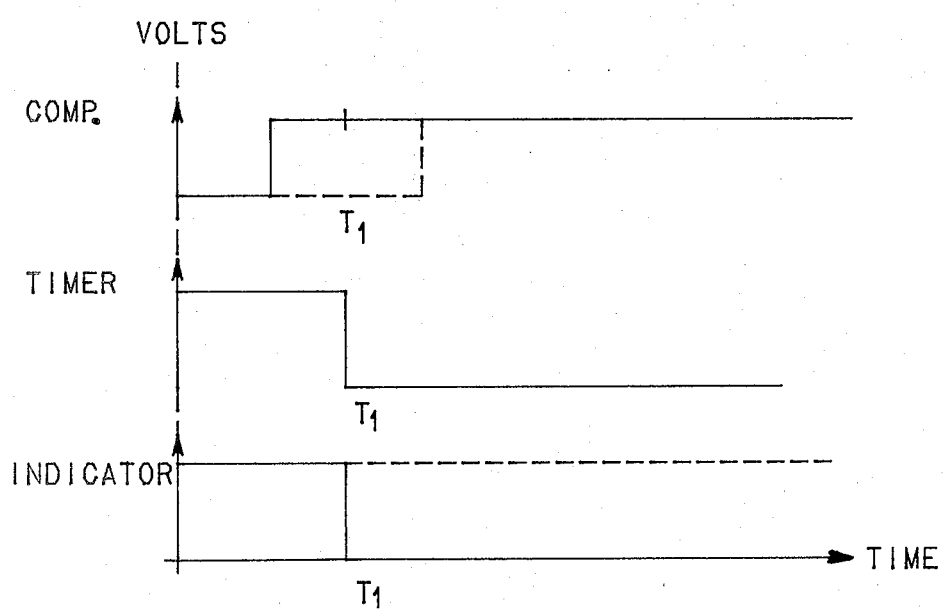

When the charging voltage $V_c$ of the capacitor 14 exceeds the voltage of the source $V_{ref}$, the output signal of the comparator 19 changes to the "high" state as shown in FIGS. 2A and 2B. At the end of the time constant $T_1$ of the timer 15, the C input of the flip-flop 16 goes "low". If the D input of the flip-flop 16, is "high" before the C input goes "low", the flip-flop 16 changes over to its second stable switch condition in which the Q output goes "high" and switches the indicator 18 (as shown by the solid line in FIG. 2) OFF. If, however, the comparator output is "low" indicating that the voltage of the storage capacitor 14 has not exceeded the reference voltage $V_{ref}$ at the time the C input goes "low", the flip-flop 16 remains in its first stable switch condition in which the Q output is "low" and the indicator 18 remains ON as shown by the dotted line in FIG. 2B.

In accordance with the teaching of the present invention the reference voltage $V_{ref}$ is selected so as to be very low compared to the final charging voltage $V_{cmax}$, of the comparator 14 and the time constant $T_1$ of the timer 15 is selected so as to be very short compared to the total charging time of $T_c$ the capacitor 14. The length of the time constant $T_1$ required for accurate indication of battery condition is a function of the size of the capacitor 14. The magnitude of the voltage $V_{ref}$ is a function of the size of the capacitor 14 and the type of flash system used, non-quench, quench, energy saving quench, etc. As a general rule, I have found that a reliable indication of battery voltage can be achieved when the reference voltage $V_{ref}$ is selected to be approximately ⅓ the magnitude of the desired charging voltage $V_{cmax}$ and the time constant $T_1$ is selected to be approximately 1/9th to 1/10th of the time $T_c$ nominally required to charge the capacitor to $V_{cmax}$. As a result, the charge condition of the battery 12 is indicated very shortly after the main switch 11 has been switched ON shortly after the main switch 11 has been switched ON (see FIG. 2B).

In the preferred embodiment of the invention the indicator 18 is a light-emitting diode (LED) and the fact that the LED 18 is turned OFF shortly after the main switch 11 is switched ON indicates that the battery 12 is sufficiently charged. If the LED 18 remains ON, this indicates that the battery 12 is not sufficiently charged.

The invention has been described in detail with reference to a preferred embodiment thereof but it will be understood that variations and modifications can be effected within the spirit and scope of the invention. For example, as shown in dotted line in FIG. 1, an indicator 21 could be connected to the $\overline{Q}$ output of the flip-flop 16 instead of connecting the indicator 18 to the Q output as previously described. In this case, the turning ON of the indicator 21 shortly after the main switch 11 has been closed would indicate that the battery 12 is sufficiently charged whereas the failure of the indicator 21 to turn ON would indicate that the battery is not sufficiently charged. Another possibility would be to provide both indicators 18 and 21, the indicator 18 being designed, for example, as a red lamp and the indicator 21 as a green lamp. Lighting up of the green lamp 21 would then indicate a "battery OK" condition and lighting up of the red lamp would indicate a "battery dead" condition. Furthermore, if desired the output signal of the flip-flop 16 indicating insufficient battery charge could be used to prevent the release of the camera shutter.

I claim:

1. In a camera having a flash unit with a storage capacitor, and having a battery for charging the capacitor, apparatus for determining the charge condition of the battery during the charging of said capacitor, said apparatus comprising:
    means for initiating the charging of said capacitor;
    means for generating a reference voltage which is a predetermined fraction of a desired charging voltage of said capacitor;
    means for measuring the charging voltage of said capacitor a predetermined time after initiation of charging, said time being a predetermined fraction of the time nominally required to charge said capacitor to its desired charging voltage;
    an energizable indicator; and
    means for comparing the measured voltage to the reference voltage and for energizing said indicator if the measured voltage bears a predetermined relationship to the reference voltage.

2. The apparatus according to claim 1 wherein said reference voltage is approximately one-third of the desired charging voltage of said capacitor.

3. The apparatus according to claim 1 wherein the charging voltage of said capacitor is measured at predetermined time which is approximately one-tenth of the time nominally required to charge said capacitor to its desired charging voltage.

4. The apparatus according to claim 1 wherein said comparing and energizing means comprises a D-type, edge triggered flip-flop.

5. The apparatus according to claim 4 further comprising a timer for producing a signal a predetermined time after its actuation, a switch coupled between said battery and said timer and having an on-state and an off-state, and a differentiating capacitor coupled between said switch and said flip-flop, the switching of said switch to the on state activating said timer and causing said differentiating capacitor to set said flip-flop to a predetermined switch condition.

6. The apparatus according to claim 4 wherein said comparing and energizing means further comprises a comparator having a first input connected to said reference voltage, a second input connected to said storage capacitor and an output connected to the D input of said flip-flop.

* * * * *